United States Patent [19]

Nakagawa et al.

[11] 4,246,600
[45] Jan. 20, 1981

[54] COLOR IMAGE PICK-UP SYSTEM FOR A COLOR TELEVISION SYSTEM

[75] Inventors: Shiro Nakagawa; Kiyoshi Matsui, both of Tokyo, Japan

[73] Assignees: TDK Electronics Company Limited; Olympus Optical Co., Ltd., both of Tokyo, Japan

[21] Appl. No.: 17,255

[22] Filed: Mar. 5, 1979

[30] Foreign Application Priority Data

Mar. 3, 1978 [JP] Japan .............................. 53/23605

[51] Int. Cl.³ ......................................... H04N 9/07
[52] U.S. Cl. ................................................ 358/44
[58] Field of Search ........................... 358/41, 43, 44; 350/311, 317; 250/226

[56] References Cited

U.S. PATENT DOCUMENTS

| | | | |
|---|---|---|---|
| 3,971,065 | 7/1976 | Bayer | 350/317 |
| 3,982,274 | 9/1976 | Chai | 358/41 |
| 4,042,956 | 8/1977 | Yamanaka | 358/41 |
| 4,151,553 | 4/1979 | Sugihara | 358/44 |

*Primary Examiner*—Howard W. Britton
*Assistant Examiner*—Michael A. Masinick

*Attorney, Agent, or Firm*—Armstrong, Nikaido, Marmelstein & Kubovcik

[57] ABSTRACT

A color image pickup system for a color television system comprises a single image pickup device, a color filter mounted in front of the screen of said image pickup device, said color filter having an array of the repetition of a pair of horizontal colored belts or scanning lines, the first scanning line having an arrangement of cells of the three elementary colors, the second scanning line having an arrangement of the complementary elementary colors to those of the first scanning line. Thus, the colors of each pair of cells in the vertical direction of the two scanning lines are complementary. The output of the image pickup device is processed by adding the signals of the first scanning line and the second scanning line for every vertical cell to provide a brightness signal(Y). As a color signal, only the first scanning line is selected and a pair of color cells (red and blue) are sampled. Thus, the horizontal resolution of the brightness signal is the same as that of the image pickup device itself, and a clear picture with high resolution is obtained in a single image pickup device system.

6 Claims, 7 Drawing Figures

Fig. 1A
Fig. 1B
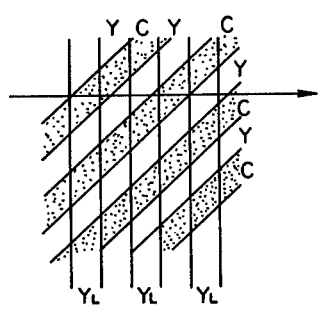
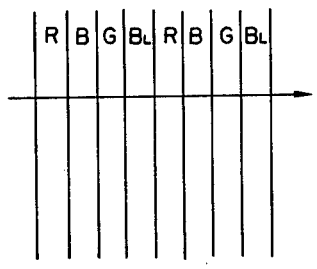
Fig. 2
|  | $H_1$ | $H_2$ | $H_3$ | $H_4$ | | | ... | $H_n$ |
|---|---|---|---|---|---|---|---|---|
| $V_1$ | R | B | ½Y | R | B | Y/2 | | |
| $V_2$ | C | $Y_L$ | ½Y | C | $Y_L$ | Y/2 | | |
| $V_3$ | R | B | Y/2 | R | B | Y/2 | | |
| $V_4$ | C | Y | Y/2 | C | $Y_L$ | Y/2 | | |
| ⋮ | | | | | | | | |
| $V_m$ | | | | | | | | |
Fig. 3
|  | $H_1$ | $H_2$ | $H_3$ | $H_4$ | $H_5$ | $H_6$ | $H_7$ | $H_8$ | $H_9$ | ... | $H_n$ |
|---|---|---|---|---|---|---|---|---|---|---|---|
| $V_{11}$ | R | B | Y/2 | R | B | Y/2 | R | B | Y/2 | | |
| $V_{21}$ | R | B | Y/2 | R | B | Y/2 | R | B | Y/2 | | |
| $V_{12}$ | C | $Y_L$ | Y/2 | C | $Y_L$ | Y/2 | C | $Y_L$ | Y/2 | | |
| $V_{22}$ | C | $Y_L$ | Y/2 | C | $Y_L$ | Y/2 | C | $Y_L$ | Y/2 | | |
| $V_{13}$ | R | B | Y/2 | R | B | Y/2 | R | B | Y/2 | | |
| $V_{23}$ | R | B | Y/2 | R | B | Y/2 | R | B | Y/2 | | |
| $V_{14}$ | C | $Y_L$ | Y/2 | C | $Y_L$ | Y/2 | C | $Y_L$ | Y/2 | | |
| $V_{24}$ | C | $Y_L$ | Y/2 | C | $Y_L$ | Y/2 | C | $Y_L$ | Y/2 | | |
| ⋮ | | | | | | | | | | | |
| $V_{1\cdot m/2}$ | | | | | | | | | | | |
| $V_{2\cdot m/2}$ | | | | | | | | | | | |

COLOR IMAGE PICK-UP SYSTEM FOR A COLOR TELEVISION SYSTEM

BACKGROUND OF THE INVENTION

The present invention relates to a color image pickup system for a color television system, and also relates to the color filter for that purpose. The present invention can be utilized in an image pickup system using a solid state image pickup element like a charge coupled device (CCD).

There have been three known systems for color image pickup, a three-tube system, a twin-tube system, and a single-tube system. In a three-tube system, the color of an image is divided to three elementary colors through a spectrofilter, and each color element of the image is illuminated on the screen of an image pickup tube. In a twin-tube system, the brightness is picked-up by the first tube, and the color hue (the combination of red and blue, or red and green) is picked-up by the second tube. While in a single-tube system, both the brightness and the color are picked-up by a single tube. Generally, the three-tube and twin-tube systems are better than the single-tube system as far as picture quality is concerned. However, said two systems have the disadvantage that the characteristics of the two or three pickup devices must be exactly equal, and the structure of the apparatus is complicated. It should be appreciated that it is rather difficult to obtain a plurality of image pickup devices of the same characteristics. On the other hand, a single-tube system has provided both the brightness signal and the color signal for a color television system by utilizing a color stripe filter shown in FIG. 1(A) or FIG. 1(B), or by controlling the pickup characteristics of the pickup cells of the pickup tube. In FIGS. 1(A) and 1(B), "C" shows cyan "$Y_1$" is yellow, "R" is red, "B" is blue, "G" is green, "$B_1$" is black, and "Y" is transparent. In FIG. 1(A), a filter has a transparent substrate (Y) with stripes of yellow ($Y_1$) and inclined stripes of cyan (C). The scanning by an image device is performed horizontally along the arrow in the figure, and each scanning line picks up the color components cyan, white, yellow, etc. Those color components are differentiated by utilizing the frequency difference of those color components, or by applying a strobe pulse to the scanned signal to sample each color component from said scanned signal. In FIG. 1(B), four stripes of red(R), blue(B), green(G), and black($B_1$) are arranged as shown in the figure, and the scanning is performed along the horizontal line, therefore, the four components appear in the scanning line in sequence. Those color components are picked up by applying a strobe pulse to the scanned signal to sample the same and differentiate each color component.

However, the prior single-tube system shown in FIGS. 1(A) and 1(B) has the disadvantage that the picture quality or resolution, and the brightness of the picked up image are insufficient, since each picture cell is substantially composed of three or four color cells. That is to say, the resolution of the color television signal utilizing the color filter in FIG. 1(A) or FIG. 1(B) is only one third or one fourth of the resolution of a black-and-white television signal. Further, it should be noted that when a CCD device (charge coupled device) is utilized as an image pickup device, the resolution is not sufficient since the resolution or the number of the CCD device cells is not sufficient. Accordingly, the picture quality of a prior color television system utilizing a single image pickup device has not been acceptable.

Although we referred to three-tube systems, twin-tube systems or single-tube systems, those terms should be replaced by three-device systems, twin-device systems or single-device systems when a solid state image pickup device like CCD is utilized.

SUMMARY OF THE INVENTION

It is an object, therefore, of the present invention to overcome the disadvantages and limitations of prior color image pick-up system by providing a new and improved color image pick-up system.

It is also an object of the present invention to provide a new and improved color image pick-up system which can provide improved resolution in a single device system.

The above and other objects are attained by a color image pick-up system having a single image pickup device, a color filter mounted in front of the screen of said image pickup device and said color filter having an array of color cells with the three elementary colors in the first horizontal scanning line and another three elementary colors in the second horizontal scanning line, the colors in the first scanning line being complementary to those of the second scanning line for every adjacent vertical cell, means for providing the sum of the signals of the first scanning line and the second scanning line for each cell only for a higher frequency than the predetermined frequency, and passing through the output of the image pickup device for signals of another frequency such as the brightness output(Y), and means for sampling the color cells only of the first scanning line to provide the color output signal.

BRIEF DESCRIPTION OF THE DRAWINGS

The foregoing and other objects, features, and attendant advantages of the present invention will be appreciated as the same become better understood by means of the following description and accompanying drawings wherein FIG. 1(A) and FIG. 1(B) show the pattern of a prior color filter, FIG. 2 shows the pattern of the present color filter, FIG. 3 shows the pattern of the other color filter according to the present invention.

DESCRIPTION OF THE PREFERRED EMBODIMENTS

Figure 4:
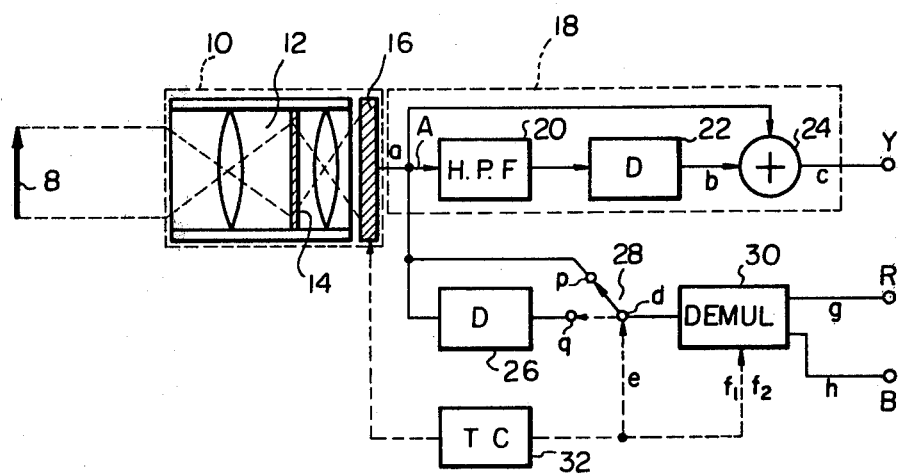
FIG. 4 is a block diagram of the color television pickup system according to the present invention.

FIG. 2 shows the pattern of the color filter according to the present invention, and it is supposed that each cell of the filter in FIG. 2 is positioned corresponding to the relating cell of a solid image pickup device, and the screen of the image pickup device has "m" cells in the vertical direction ($V_1$, $V_2$, $V_3$, $V_4$, $V_m$) and "n" cells in the horizontal direction ($H_1$, $H_2$, $H_3$, $H_4$, $H_n$). Each cell ($V_i \cdot H_j$) provides a picture cell of a color image pickup system. The scanning in an image pickup device is performed in the horizontal direction. On the first scanning line ($V_1$), three color cells red(R), blue(B) and gray (1/2Y) are arranged repetitively in sequence as shown in the figure, where gray (1/2Y) is a semi-transparent cell in which the brightness is halved. It should be appreciated that the above three colors (R,B,Y) are sufficient to produce the three elmentary colors for a color television system. On the second scanning line ($V_2$), another three color cells cyan (C), yellow($Y_1$) and gray (1/2Y) are arranged repetitively in sequence as shown in the figure. It should be noted that the cyan (C) on the second scanning line is in the same column as that of red (R) on the first line, and that cyan (C) is the complementary color of red (R), that is to say, the mixture of cyan (C) and red (R) provides gray. Similarly, yellow ($Y_1$) which is the complementary color of blue (B) is on the same column as blue. The pattern of the third line ($V_3$), the fifth line ($V_5$), and in general the odd'th line is the same as that of the first line ($V_1$), and the pattern of the fourth line ($V_4$), the sixth line ($V_6$), and in general the even'th line is the same as that of the second line ($V_2$).

On the other hand, on the first column, red (R) and cyan (C) are arranged repetitively as shown in the figure, and those two colors are complementary to each other. On the second column, blue (B) and yellow ($Y_1$) are arranged repetitively and those two colors are complementary to each other. On the third column, gray (1/2Y) is arranged and it should be noted that the combination of two gray cells provides the complete brightness ($\frac{1}{2}Y+\frac{1}{2}Y=Y$). The fourth column ($H_4$), the seventh column ($H_7$), are the same as the first column ($H_1$), and the fifth column ($H_5$), the eighth column ($H_8$), are the same as the second column, and the sixth column ($H_6$), the ninth column ($H_9$), are the same as the third column ($H_3$). The scanning of the pattern in FIG. 2 is performed horizontally from left to right, that is, the first scanning line $V_1$ is scanned from $H_1$ to $H_n$, and next the second scanning line $V_2$ is scanned from $H_1$ to $H_n$. After the last scanning line $V_m$ is scanned, the first scanning line $V_1$ is scanned again.

FIG. 3 shows the other embodiment of the pattern of a color filter according to the present invention, and the pattern of FIG. 3 is preferable for interlaced scanning systems. In FIG. 3, the first line $V_{11}$ is the same as the second line $V_{21}$, and the third line $V_{12}$ is the same as the fourth line $V_{22}$. The first line $V_{11}$ and the second line $V_{21}$ are the complementary colors of the third line $V_{12}$ and the fourth line $V_{22}$, respectively. Generally, two scanning lines are in complementary color with the next two scanning lines. In FIG. 3 the scanning is performed in the interlaced format, that is to say, in the first field, the scanning lines $V_{11}$, $V_{12}$, $V_{13}$, are scanned, and in the second field, the scanning lines $V_{21}$, $V_{22}$, $V_{23}$, are scanned. It should be noted that in each field a pair of adjacent scanning lines are in complementary relationship.

FIG. 4 is the block diagram of the color image pickup system according to the present invention. In the figure, the housing 10 mounts the image pickup device 16, which is, for instance, a charge coupled device (CCD). In front of the image pickup device 16, the relay lens 12 is mounted, and in the relay lens 12 the color filter shown in FIG. 2 or FIG. 3 is inserted as shown in the figure. The image of the object 8 is projected on the image pickup device 16 through the relay lens 12, and also the image of the pattern of the color filter 14 is projected on the image pickup device 16, thus, the filtered image is projected on the screen of the device 16. At the output point (A) of the image pickup device 16, the signal sequence of FIG. 6(a) or FIG. 6(b) is obtained. FIG. 6(a) shows the case in which the first kind of scanning line is scanned first and next the second kind of the line which is complementary with the first kind is scanned second. Therefore, the color cells of the sequence R,B ($\frac{1}{2}$Y) are obtained first, and next the sequence C, $Y_1$ ($\frac{1}{2}$Y) is obtained. FIG. 6(b) shows the case in which the second kind of scanning line is scanned first and next the first kind of the scanning line is scanned. Therefore, the sequence C, $Y_1$, ($\frac{1}{2}$Y) is obtained first and next the sequence R,B ($\frac{1}{2}$Y) is obtained.

The signal at the point (A) is applied to one input of the adder 24 and to the input of the high pass filter 20 the cutoff frequency of which is, for instance, 1 MHz. The output of the high pass filter 20 is also applied to the other input of the adder 24 through the delay circuit 22 which delays the signal by a single scanning line. Accordingly, provided that the signal frequency at the point (A) is higher than the cutoff frequency of the high pass filter 20, when the signal shown in FIG. 6(a) appears at the point (A), the signal shown in FIG. 6(b) appears at the output of the delay circuit 22, and on the other hand, when the signal of FIG. 6(b) appears at the point (A), the signal of FIG. 6(a) appears at the output of the delay circuit 22. Thus, the adder 24 adds the signals of FIG. 6(a) and FIG. 6(b) and provides the sum as shown in FIG. 6(c). In FIG. 6(c), it should be appreciated that the addition of red (R) and cyan (C) provides the sum (Y) which has no color but only brightness, since red (R) is the complementary color of cyan (C). Similarly, the addition of blue (B) and yellow ($Y_1$) provides the sum (Y), since blue (B) is the complementary color of yellow ($Y_1$). Also, in the third cell the addition of ($\frac{1}{2}$/Y) and ($\frac{1}{2}$/Y) provides of course (Y). Therefore, all the cells at the output of the adder 24 are (Y) as shown in FIG. 6(c). On the other hand, when the frequency at the point (A) is lower than the cutoff frequency of the high pass filter 20, the signal at the point (A) is directly provided at the output terminal as the brightness signal (Y).

Accordingly, the resolution concerning the brightness (Y) in the present invention is as follows. In the horizontal direction, the resolution of the signal obtained at the output of the adder 24 is the same as the resolution of the image pickup device itself, and in the vertical direction the resolution at the output of the adder 24 is the same as that of an image pickup device when the signal frequency is lower than the cutoff frequency of the high pass filter 20. And said resolution in the vertical direction is half that of the image pickup device when the signal frequency is higher than the cutoff frequency of the high pass filter 20, since two scanning lines are combined by the adder 24 at the higher frequency. The above fact that the horizontal brightness resolution is the same as that of the image sensor itself is the important feature of the present invention over the prior art, which provides only one third or one fourth of the resolution of the image sensor. That feature of the present invention is due to the particular pattern of the color filter in FIG. 2 and FIG. 3, in which complementary cells are arranged in the vertical direction. Also, in the vertical direction the resolution is the same as that of the image sensor as long as the signal frequency is lower, although some minor uniformity of brightness appears due to the difference of the transparency of the red and cyan cells, and the blue and yellow cells. At the high frequency in the vertical direction, the uniformity of brightness does not appear, instead the resolution is halved.

Now, the separation of the color signals red and blue from the scanned signal will be explained.

Figure 6:
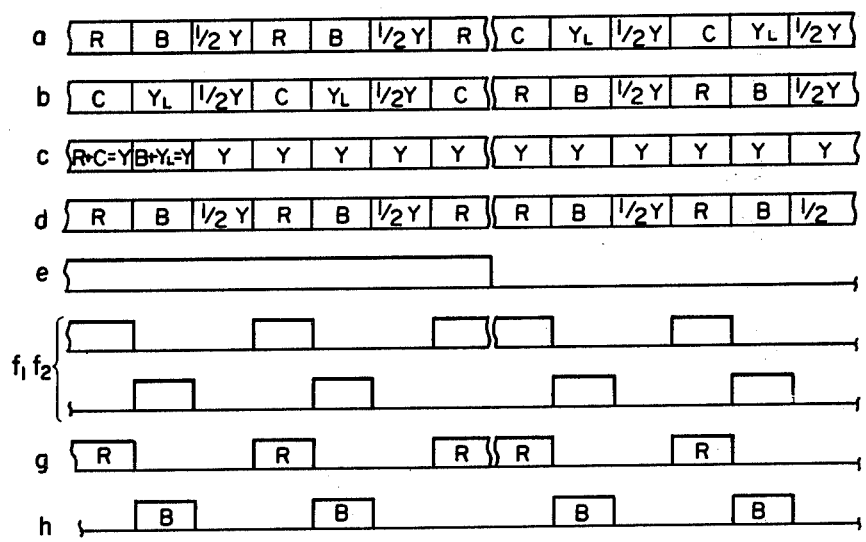
FIG. 6 shows the timing sequence for operation of the present apparatus of FIG. 4 or FIG. 5.

In FIG. 4, the output of the image sensor 16 is applied to the terminal (p) of the switch 28, the other terminal (q) of which receives the output of the image sensor 16 through the delay circuit 26 which delays the signal by the time of a single scanning line. Accordingly, when the signal shown in FIG. 6(a) appears at the terminal (p) of the switch 28, the signal shown in FIG. 6(b) appears at the terminal (q) of the switch 28, and vice versa. The timing circuit 32 controls the switch 28 as shown in FIG. 6(e), that is to say, when the signal of FIG. 6(a) appears at the terminal (p), the switch 28 is connected to the terminal (p), and when the signal of FIG. 6(b) appears at the terminal (p), the switch is connected to the terminal (q). Accordingly, at the output (d) of the switch 28, the signal shown in FIG. 6(d) which is composed of only the first scanning line signal of FIG. 6(a), is obtained. The output of the switch 28 is applied to the demultiplexer 30, which also receives the timing pulses ($f_1$) and ($f_2$) as shown in FIG. 6($f_1$) and FIG. 6($f_2$). The timing pulse ($f_1$) strobes the red cell (R) in FIG. 6(d) and provides the sequence shown in FIG. 6(g) as the output of the red signal (R). Also the timing pulse ($f_2$) strobes the blue cell (B) in FIG. 6(d) and provides the sequence shown in FIG. 6(h) as the output of the blue signal (B).

From the above, the resolution concerning the color is as follows. In the horizontal direction the resolution of the color signal is one third of the resolution of the image sensor, since the cell (R) or (B) is sampled in every three cells. And in the vertical direction, the resolution of the color signal is half of that of an image sensor since the switch 28 inputs the signals at every other scanning lines.

Accordingly, the resolution of the present invention is summarized below, provided that an image sensor has (n) cells in the horizontal direction and (m) cells in the vertical direction.

| (a) Brightness (Y) | Horizontal; | n |
| --- | --- | --- |
| | Vertical; | m/2 at higher frequency |
| | | m at lower frequency |
| (b) Color (B and R) | Horizontal; | n/3 |
| | Vertical; | m/2 |

The boundary between the higher frequency and the lower frequency is defined by the cutoff frequency of the high pass filter 20, and said cutoff frequency is determined to be approximately n/300 MHz. The reason for this cutoff frequency (n/300 MHz) is as follows. The time for scanning a single scanning line is approximately 64 $\mu$S including both the picture signal and synchronization signals in present standard television systems like NTSC, or PAL. During that scanning time of 64 $\mu$S, the time for scanning only the picture signal is approximate 50 $\mu$S, that is to say, the synchronization signals occupy approximately 14($=64-50$)$\mu$S. On the other hand, when an image sensor has (n) cells in the horizontal direction, The highest picture frequency is n/2 in said 50 $\mu$S in which a black cell and a white cell appear alternately in the horizontal direction. The frequency n/2 in 50 $\mu$S is (n/100) MH$_z$. Next, in the arrangement of the color filter in FIG. 2 and FIG. 3, the cell ($\frac{1}{2}$Y) appears once in every three cells. Accordingly, horizontal resolution one third of that of an image sensor can be obtained even when no particular circuits were provided. The frequency of the resolution of said one third corresponds to ($\frac{1}{3}$)$\times$(n/100) MH$_z$=(n/300) MH$_z$. Therefore, according to the present invention, the frequency higher than (n/300) MH$_z$ is processed by the delay circuit 22 and the adder 24 to improve the horizontal resolution so that it is equal to that of an image sensor itself, and the frequency lower than (n/300) MH$_z$ is directly output without any processing since the lower frequency signals have originally the same resolution as that of an image sensor itself. The compensation for obtaining horizontal resolution equal to that of an image sensor itself is to halve the vertical resolution, since a pair of vertical lines are combined by the adder 24. If the high pass filter 20 were not provided and all the frequency signals were added in the adder 24, the vertical resolution would be halved at all frequencies.

It should be noted that the horizontal resolution for brightness is three times as high as that of a prior single-device system and that feature improves the picture quality considerably. On the other hand, the vertical resolution of the present invention is not better than that of a prior art. However, the fact that the vertical resolution is low does not cause any deterioration of picture quality. As a matter of fact, an ordinary television receiving set disregards the high frequency component by passing the signal through a low pass filter, although a television transmission station obtains the high frequency component using a comb-like characteristic filter and transmits said high frequency component. And from the fact that an ordinary television set provides sufficient picture quality, the present invention can also provide excellent picture quality although the vertical resolution is not improved.

The above explanation of FIG. 4 is also applicable to the embodiment of the color filter shown in FIG. 3, except the addition of the scanning line signals is carried out as $V_{11}+V_{12}$, $V_{21}+V_{22}$, etc.

Figure 5:
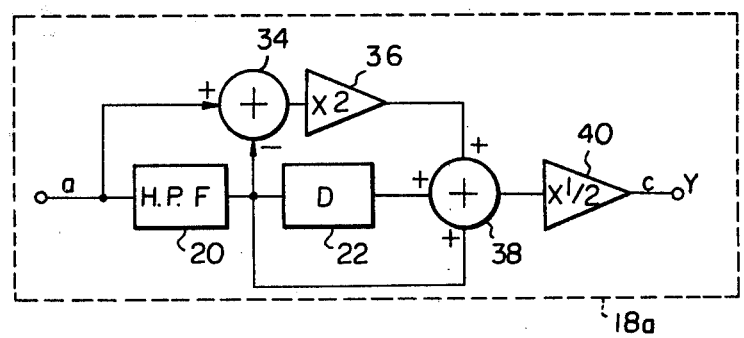
FIG. 5 is a block diagram of the modification of the delay unit which is substituted at the dotted portion in FIG. 4.

FIG. 5 shows a block diagram of the modification of the delay unit 18 in FIG. 4, and the delay unit 18a in FIG. 5 can replace the delay unit 18 in FIG. 4. In FIG. 5, the frequency component lower than the cutoff frequency of the high pass filter 20 goes through the adder 34, the doubler 36, and adder 38 and the half circuit 40. The doubler 36 doubles the amplitude of the imput signal, and the half circuit 40 provides the half amplitude of the input signal, thus, the amplitude of the output signal of the unit 18a is the same as that of the input signal. On the other hand, the frequency component higher than the cutoff frequency of the high pass filter 20 passes through the high pass filter 20, and the output of the high pass filter 20 is provided to the subtract input of the adder 34, then, the output of the adder 34 is zero. The output of the high pass filter 20 is also applied to the delay circuit 22 and the adder 38, thus, the amplitude of the output of the adder 38 is twice that of the input signal of the unit 18a, and said output of the adder 38 is applied to the half circuit 40, which provides half the input amplitude. Accordingly, the amplitude of the output signal (Y) of the unit 18a is always the same as that of the input signal of the unit 18a. That is to say, the amplitude of the output signal of the higher frequency is the same as that of the lower frequency.

As a preferable embodiment of the present invention, a CCD area sensor having 320$\times$256 cells is utilized as an image pickup device, and the color filter in FIG. 2 inserted in a relay lens is installed in front of the screen of the image sensor. The cutoff frequency of the high pass filter 20 in FIG. 4 is $f_c=$1MH$_z$, since the number of cells in the horizontal direction is (n)=320, and $f_c=(n/300)=(320/300)\approx 1$.

The compensation characteristics in this case is flat up to 1MH$_z$ and is processed by a comb-shaped filter from 1MH$_z$ to 3MH$_z$. And the resolution in this case is as follows.

| | | |
|---|---|---|
| (a) Brightness (Y) | Horizontal; | 300 lines |
| | vertical; | 256/2 = 128 for the component higher than 1 MH$_z$, and 256 lines for the components lower than 1 MH$_z$ |
| (b) Color (B and R) | Horizontal; | 100 lines |
| | Vertical; | 128 lines |

As described in detail, the present invention utilizes a particular color filter with an alternate arrangement of complementary colors, and the signals of a pair of complementary cells are added to each other, thus, high resolution and a clear picture is obtained with a single image sensor.

Said color filter can be manufactured through a conventional photolithography process.

From the foregoing it will not be apparent that a new and improved color image pickup system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A color image pick-up system for a color television system comprising:
   (a) a single image pick-up device including a screen for projecting an image through a lens for generating an electrical scan signal corresponding to the image projected on the screen;
   (b) a color filter mounted in front of the screen of said image pick-up device, said color filter having an array comprising a plurality of color cells arranged on a plurality of horizontal lines corresponding to the horizontal scan lines, color cells for the primary colors being arranged on one set of alternate horizontal lines, and color cells for the complements of the primary colors being arranged on another set of alternate horizontal lines, wherein a color cell for a primary color and a color cell for its complementary color are vertically aligned on adjacent horizontal rows;
   (c) sum means for providing the sum of the electrical scan signals of one horizontal scan line of said one set of horizontal scan lines and those of an adjacent horizontal scan line of said another set of horizontal scan lines on an individual cell-to-cell basis for scan signals of a higher frequency than a predetermined frequency, and passing through the output of the image pick-up device for other frequency signals to thereby provide the brightness output;
   (d) means for providing the electrical scan signals only of the one set of horizontal scan lines to provide the color output signal.

2. A color image pick-up system for a color television system according to claim 1 wherein the colors of the cells in the one set of horizontal scanning lines repeat the sequence of red, blue and transparent, and the colors of the cells of the another set of horizontal scanning lines repeat the sequence of cyan, yellow and transparent.

3. A color image pick-up system for a color television system according to claim 1 wherein the colors of the two adjacent horizontal scan lines are complementary with those of the next two adjacent horizontal scan lines for interlaced scanning.

4. A color image pick-up system for a color television system according to claim 1 wherein said sum means comprises a high pass filter, a delay circuit which delays the output of said high pass filter by the time of a single scanning line, and an adder, one input of which is coupled to the output of the delay circuit and the other input of which is coupled to the input of said high pass filter.

5. A color image pick-up system for a color television system according to claim 4 wherein the cutoff frequency of the high pass filter is approximately n/300 MH$_z$.

6. A color filter for a color television system comprising an array of color cells with the three primary colors in a first horizontal scanning line and another three complementary primary colors in a second horizontal scanning line, the colors in the first scanning line being complementary to that of the second scanning line for an adjacent cell in the vertical direction.

* * * * *